US010053010B2

(12) United States Patent
Thompson et al.

(10) Patent No.: US 10,053,010 B2
(45) Date of Patent: Aug. 21, 2018

(54) DYNAMIC PERSPECTIVE SHIFTING SYSTEM AND METHOD

(71) Applicant: Dura Operating, LLC, Auburn Hills, MI (US)

(72) Inventors: Aaron Evans Thompson, Grand Blanc, MI (US); Benjamin Saltsman, Bloomfield Township, MI (US); Sean O'Rourke, Lake Orion, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 193 days.

(21) Appl. No.: 14/959,723

(22) Filed: Dec. 4, 2015

(65) Prior Publication Data

US 2017/0163939 A1  Jun. 8, 2017

(51) Int. Cl.
*B60R 11/04* (2006.01)
*B60R 1/00* (2006.01)
*B60R 11/00* (2006.01)

(52) U.S. Cl.
CPC .............. *B60R 1/002* (2013.01); *B60R 11/04* (2013.01); *B60R 2011/004* (2013.01); *B60R 2300/101* (2013.01); *B60R 2300/103* (2013.01); *B60R 2300/306* (2013.01)

(58) Field of Classification Search
CPC ... B60R 1/00; B60R 11/04; B60R 2300/8066; B60R 2001/1215; B60R 2001/1253; B60R 2011/004; H04N 5/23296
See application file for complete search history.

(56) References Cited

U.S. PATENT DOCUMENTS

| 7,729,507 | B1* | 6/2010 | Malachowsky .... H04N 5/23248 348/208.1 |
| 2010/0129070 | A1* | 5/2010 | Balasundaramohan G03B 17/00 396/419 |
| 2012/0154591 | A1* | 6/2012 | Baur ........................ B60R 1/00 348/148 |
| 2012/0169875 | A1* | 7/2012 | Matsukawa ............... B60R 1/00 348/148 |
| 2013/0128039 | A1* | 5/2013 | Meier ..................... B60R 11/04 348/143 |
| 2014/0347469 | A1 | 11/2014 | Zhang et al. |
| 2015/0035991 | A1 | 2/2015 | Sachs et al. |

* cited by examiner

*Primary Examiner* — Obafemi Sosanya
(74) *Attorney, Agent, or Firm* — Robert E. Ford; Raymond J. Vivacqua; Steven L. Crane

(57) ABSTRACT

A system for displaying an image on a display device of a motor vehicle includes a rear-view camera connected to a moveable component on the motor vehicle and a controller in communication with the rear-view camera. The controller has memory for storing control logic and a processor configured to execute the control logic. The control logic includes capturing a field of view image from the rear-view camera, determining a position of the rear-view camera, determining an image perspective relationship of the field of view image based on the position of the rear-view camera, modifying the field of view image based on the image perspective relationship to create a virtual perspective image, and displaying the virtual perspective image on the display device in the motor vehicle as the position of the rear-view camera changes between at least a first position and a second position.

17 Claims, 2 Drawing Sheets

DYNAMIC PERSPECTIVE SHIFTING SYSTEM AND METHOD

FIELD

The invention relates generally to a dynamic perspective shifting system and method using a camera on a motor vehicle, and more particularly to a dynamic perspective shifting system and method that shifts a perspective of a rear-view camera due to camera orientation change.

BACKGROUND

The statements in this section merely provide background information related to the present disclosure and may or may not constitute prior art.

Many motor vehicles include rear-view camera systems, also known as backup camera systems and reverse camera systems, to assist an operator of the motor vehicle to view the environment directly behind the motor vehicle. The advantage of the rear-view camera system is that it allows the operator of the motor vehicle to have a complete view behind the vehicle, thus eliminating any blind spots associated with direct viewing, using rear-view and side mirrors.

A typical rear-view camera system includes a reverse camera mounted to the rear of the motor vehicle. The reverse camera is connected to a display unit in the instrument panel or dashboard of the motor vehicle. The display unit may be configured to automatically display the image from the reverse camera when the transmission has been placed in a reverse mode. The reverse camera may include a wide angle lens that allows the camera to see approximately 180 degrees behind the vehicle. The camera may be pointed at a downward angle to view possible objects or obstructions on the ground.

Rear-view cameras are especially useful on larger vehicles, such as pickup trucks and sport utility vehicles, which may have larger blind spots behind the vehicle. However, these vehicles typically have moveable attachments and components on the rear of the vehicle, such as tailgates, tire racks, lift gates, retracting or breakaway mirrors, or other types of doors. Thus it is often necessary to mount the rear-view camera on the moveable component in order to preserve the functionality of the camera. When the moveable component is raised or lowered or otherwise moved, the image from the camera becomes irrelevant to an operator of the motor vehicle since the perspective of the camera is fixed or static. Accordingly, there is a need in the art for a rear-view camera system that displays an image from the rear-view camera that maintains a perspective relevant to an operator of the motor vehicle even as the position of the camera changes.

SUMMARY

A method for displaying an image from a camera on a motor vehicle is provided. The method includes capturing a field of view image from the camera, determining a position or spatial orientation of the camera, determining an image perspective relationship of the field of view image based on the position of the camera, modifying the field of view image based on the image perspective relationship to create a virtual perspective image, and displaying the virtual perspective image on a display device in the motor vehicle.

In one aspect, the image perspective relationship relates a position of the camera, relative to the motor vehicle, to a desired perspective relative to the field of view image.

In another aspect, modifying the field of view image includes cropping the field of view image to the desired perspective.

In another aspect, modifying the field of view image further includes correcting any distortions in the cropped field of view image to create the virtual perspective image.

In another aspect, the field of view image is approximately a 180 degrees field of view.

In another aspect, determining the position of the camera includes sensing a change in a gyroscope connected to the camera.

In another aspect, determining the position of the camera includes calculating the position of the camera from first and second reference points in the field of view image.

In another aspect, the first and second reference points include left and right license plate lights.

In another aspect, determining the position of the camera includes sensing a position of an object that supports the camera on the motor vehicle.

In another aspect, the method is repeated continually so that a perspective of the virtual perspective image displayed on the display device is consistent as the position of the camera changes.

In another aspect, a graphic overlay is displayed on the virtual perspective image.

A system for displaying an image on a display device of a motor vehicle is also provided. The system includes a rear-view camera connected to a moveable component on the motor vehicle and a controller in communication with the rear-view camera. The controller has memory for storing control logic and a processor configured to execute the control logic. The control logic includes capturing a field of view image from the rear-view camera, determining a position of the rear-view camera, determining an image perspective relationship of the field of view image based on the position of the rear-view camera, modifying the field of view image based on the image perspective relationship to create a virtual perspective image, and displaying the virtual perspective image on the display device in the motor vehicle as the position of the rear-view camera changes between at least a first position and a second position.

In one aspect, the image perspective relationship relates a position of the rear-view camera to a desired perspective.

In another aspect, the control logic for modifying the field of view image includes cropping the field of view image to the desired perspective.

In another aspect, the control logic for modifying the field of view image further includes correcting any distortions in the cropped field of view image to create the virtual perspective image.

In another aspect, the field of view image is approximately a 180 degrees field of view.

In another aspect, the rear-view camera includes a gyroscope, and the control logic for determining the position of the rear-view camera includes sensing a change in the gyroscope connected to the rear-view camera.

In another aspect, the control logic for determining the position of the rear-view camera includes determining the position of the rear-view camera from first and second reference points in the field of view image using a look-up table.

In another aspect, the control logic for determining the position of the rear-view camera includes sensing a position of the component that supports the rear-view camera on the motor vehicle.

In another aspect, the control logic is repeated continuously so that a perspective of the virtual perspective image displayed on the display device is consistent as the position of the rear-view camera moves between the first position and the second position.

In another aspect, the moveable component is a tailgate of the motor vehicle.

Another system is provided for dynamically displaying an image. The system includes a processor and a non-transitory computer readable medium for storing instructions for execution by the processor. The instructions include capturing a field of view image from a rear-view camera mounted on a moveable component of a motor vehicle, determining a position of the rear-view camera relative to the motor vehicle, determining an image perspective relationship of the field of view image based on the position of the rear-view camera, wherein the image perspective relationship relates the position of the rear-view camera to a desired perspective, cropping the field of view image to the desired perspective based on the image perspective relationship, correcting the cropped field of view image to create a virtual perspective image, displaying the virtual perspective image on a display device in the motor vehicle, and repeating the instructions continually as the position of the camera changes.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
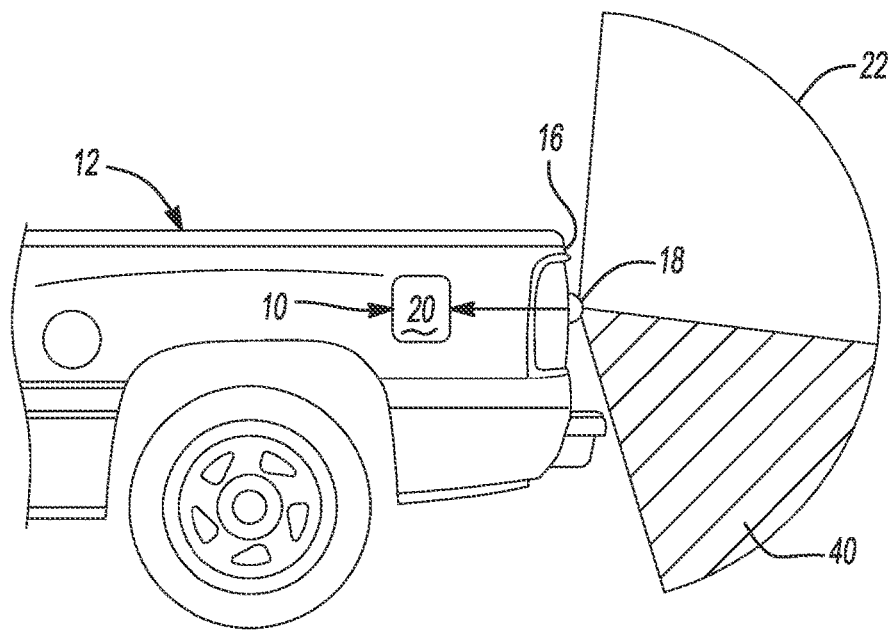
FIG. 1A is a side view of an exemplary motor vehicle having a system for displaying a perspective shifted image in a first position.
Figure 1B:
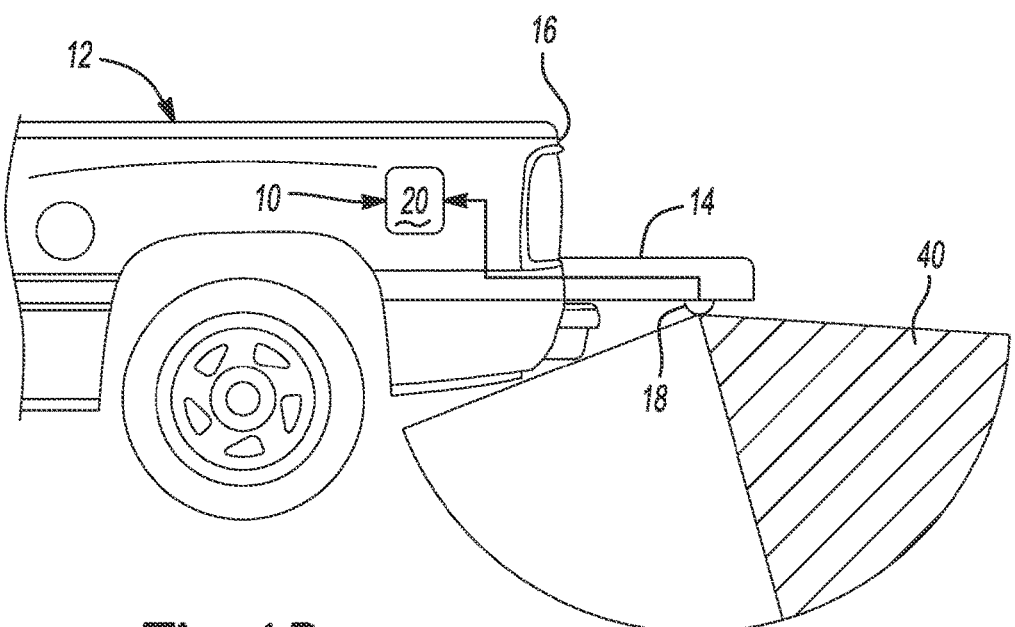
FIG. 1B is a side view of the exemplary motor vehicle having the system for displaying a perspective shifted image in a second position.

With reference to FIGS. 1A and 1B, a system for displaying a perspective shifted image is generally indicated by reference number 10. The system 10 is employed with an exemplary motor vehicle 12. In the example provided, the motor vehicle 12 is illustrated as a pickup truck. However, the motor vehicle 12 may be a passenger car, motor home, truck, or any other type of vehicle without departing from the scope of the present disclosure. Generally, the motor vehicle 12 includes a moveable component 14 mounted on a rear 16 of the motor vehicle 12. In the example provided, the moveable component 14 is illustrated as a tailgate that moves between a first position or up position, shown in FIG. 1A, and a second position or lowered position, shown in FIG. 1B. The moveable component 14 may also be, for example, a lift gate, a rear window, mirror, door, a tire rack, etc. The first and second positions of the moveable component 14 vary with the type of component. For example, where the moveable component 14 is a lift gate, the first position may be a lowered position while the second position may be a raised position.

The system 10 includes a rear-view camera 18 in communication with a controller 20. The rear-view camera 18 is connected to the moveable component 14 of the motor vehicle 12. The rear-view camera 18 is preferably a wide angle camera having a full field of view, indicated by reference number 22 in FIGS. 1A and 1B, that is approximately a 180-degree full field of view. The make and manufacture of the rear-view camera 12, as well as the specific location of the rear-view camera 12 on the moveable component 14, is preferably selected to comply with Federal Motor Vehicle Safety Standard 111 (FMVSS 111). The rear-view camera 18 communicates with the controller 20 via any wired connection, for example a bus network, or wirelessly via any wireless protocol, for example any IEEE 802.11 standard or Bluetooth.

Figure 2:
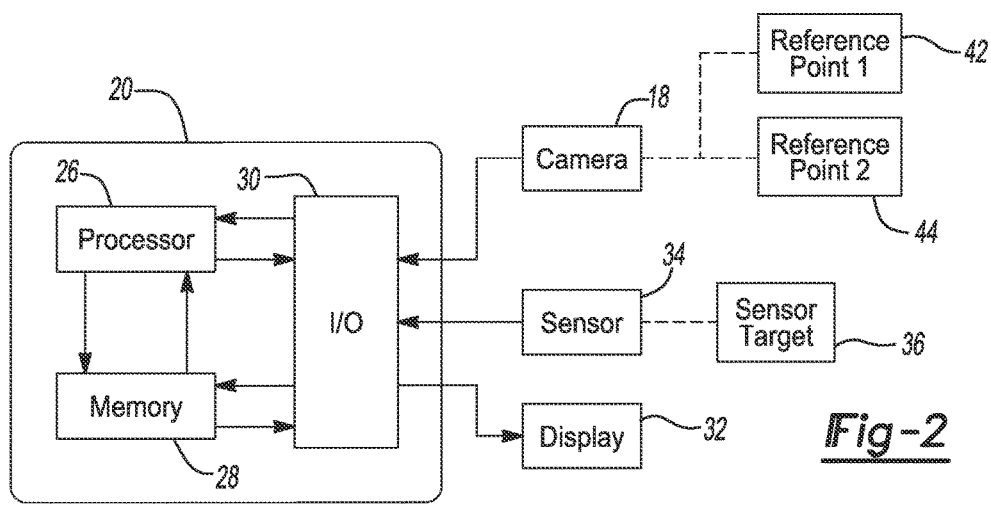
FIG. 2 is a schematic diagram of the system for displaying a perspective shifted image.

Referring to FIG. 2, the controller 20 is a non-generalized, electronic control device having a preprogrammed digital computer or processor 26, memory or non-transitory computer readable medium 28 used to store data such as control logic or instructions, and at least one I/O peripheral 30. The processor 26 is configured to execute the control logic or instructions. The controller 20 may be located in or on the rear-view camera 18 or may be integrated with the motor vehicle 12, such as part of an engine control module, transmission control module, body control module, etc.

The controller 20 is in communication with a display device 32. The display device 32 is located in the motor vehicle 12 and is viewable by an operator of the motor vehicle 12. The display device 32 may be located in an instrument panel or dashboard of the motor vehicle 12 or may be a separate, standalone display screen.

Figure 3:
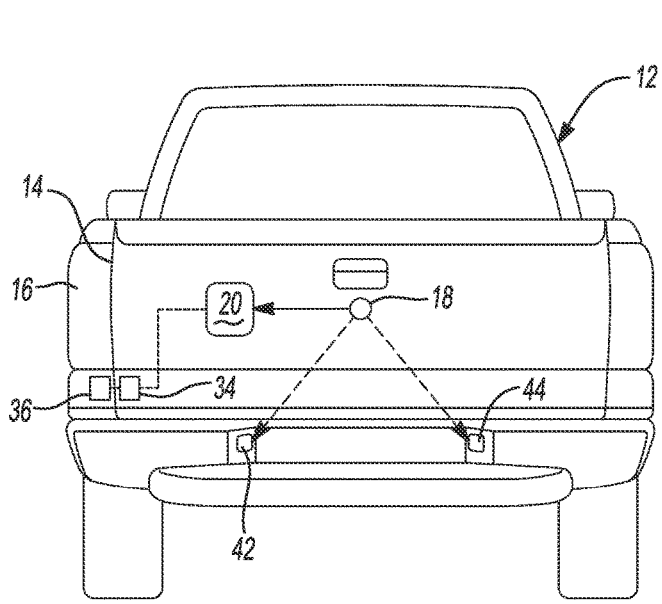
FIG. 3 is a rear-view of the exemplary motor vehicle having the system for displaying a perspective shifted image.

The controller 20 may, in some examples, communicate with an optional sensor 34. The sensor 34 is configured to sense the condition or position of a sensor target 36. The sensor target 36 is selected to provide data to the controller 20 to determine a location of the rear-view camera 18 relative to the motor vehicle 12 when the moveable component 14 moves between the first and second positions. For example, the sensor target 36 may be a gyroscope located within, or connected to, the rear-view camera 18. In another example, the sensor target 36 may be a hinge or electric motor connected to the moveable component 14, as shown in FIG. 3.

Figure 4:
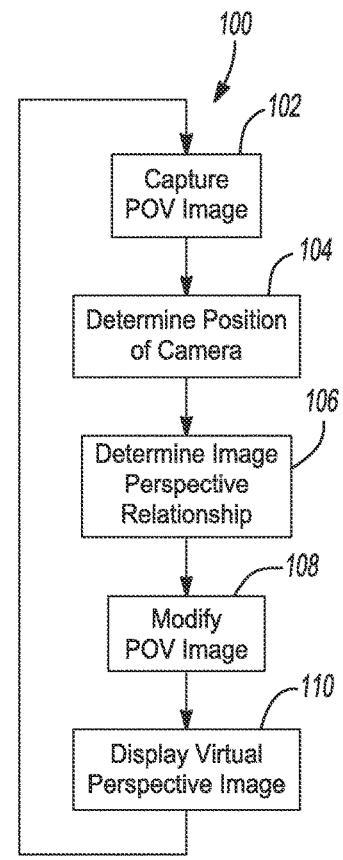
FIG. 4 is a method of displaying a perspective shifted image.

Turning to FIG. 4, and with continued reference to FIGS. 1A, 1B, 2, and 3, a method 100 for use with the system 10 is shown in a flow-diagram. In the diagram, individual steps may correspond to control logic or computer instructions stored and executed by the controller 20. The method 100 is operable to dynamically shift a perspective of an image displayed on the display device 32 as the moveable component 14, and thus the camera 18, moves between the first position and the second position. Accordingly, the method 100 provides a virtual perspective image shown on the display device 32 that complies with FMVSS 111 when the rear-view camera 18 is in the first position, the second position, or any position there between. The virtual perspective image is represented by a shaded arc 40 of the field of view image 22 in FIGS. 1A and 1B. When the rear-view camera 18 is in the first position (FIG. 1A), the virtual perspective image 40 uses a lower portion of the field of view image 22. When the rear-view camera 18 is in the second position (FIG. 1B), the virtual perspective image 40 uses an upper portion of the field of view image 22.

The method 100 begins at step 102 where the rear-view camera 18 captures the full field of view (FOV) image 22. The FOV image 22 is communicated to the controller 20. At step 104, the controller 20 determines a position of the rear-view camera 18 relative to the motor vehicle 12. In one example, the sensor 34 senses a position or change in the gyroscope 36 associated with the rear-view camera 18. Using a look-up table or algorithms, the controller 20 determines the position of the rear-view camera 18 relative to a fixed coordinate space. In another example, the sensor 34 senses a position or change in the moveable object 16. Using a look-up table or algorithms and knowing the location of the rear-view camera 18 relative to the moveable component 14, the controller 20 determines the position of the rear-view camera 18 relative to the fixed coordinate space. In still another example, the controller 20 determines the location of the rear-view camera 18 without using the sensor 34. In this example, the controller 20 calculates the position of the rear-view camera 18 from a first reference point 42 and a second reference point 44 located within the FOV image 22, best seen in FIG. 3. The first and second reference points 42, 44 may be any two objects viewable in the FOV image 22 when the moveable component 14 is in any position and detectable by the controller 20. For example, the first and second reference points may be left and right license plate lights. The controller 20 then determines the position of the rear-view camera 20 relative to the fixed coordinate space based on the distance between the first and second reference points 42, 44 in the FOV image using a look up table or algorithms.

At step 106 the controller 20 determines an image perspective relationship of the FOV image 22 captured at step 102 based on the position of the rear-view camera determined at step 104. The image perspective relationship relates the position of the rear-view camera 18, relative to the motor vehicle 12 or fixed coordinate space, to a desired perspective relative to the FOV image 22. The desired perspective is one that is relevant to an operator of the motor vehicle even if the rear-view camera 18 is in the first position, the second position, or any other position. Thus, the desired perspective of the rear-view camera 18 corresponds to the perspective of the virtual perspective image 40 that will comply with FMVSS 111.

At step 108, the controller 20 modifies the FOV image 22 captured at step 102 based on the image perspective relationship. First, the controller 20 crops the FOV image 22 to the desired perspective. Next, the controller 20 corrects for any distortions or warping in the cropped image to create the virtual perspective image 40. The controller 20 may further modify the virtual perspective image 40 by adding image overlays, such as an artificial horizon line, or by performing any other image processing.

At step 110 the virtual perspective image 40 is displayed on the display device 32. The method 100 may then repeat to provide continuous, real-time imaging as the rear-view camera 18 moves relative to the motor vehicle 12 thus assuring that a perspective of the virtual perspective image 40 displayed on the display device is consistent as the position of the rear-view camera 18 changes.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for displaying an image from a camera on a motor vehicle, the method comprising:

capturing a field of view image from the camera;
determining a position of the camera;
determining an image perspective relationship of the field of view image based on the position of the camera, wherein determining the position of the camera includes calculating the position of the camera from first and second reference points in the field of view image, wherein the first and second reference points include left and right license plate lights;
modifying the field of view image based on the image perspective relationship to create a virtual perspective image; and
displaying the virtual perspective image on a display device in the motor vehicle.

2. The method of claim 1 wherein the image perspective relationship relates a position of the camera, relative to the motor vehicle, to a desired perspective relative to the field of view image.

3. The method of claim 2 wherein modifying the field of view image includes cropping the field of view image to the desired perspective.

4. The method of claim 3 wherein modifying the field of view image further includes correcting any distortions in the cropped field of view image to create the virtual perspective image.

5. The method of claim 1 wherein the field of view image is approximately a 180 degrees field of view.

6. The method of claim 1 wherein determining the position of the camera includes sensing a change in a gyroscope connected to the camera.

7. The method of claim 1 wherein determining the position of the camera includes sensing a position of an object that supports the camera on the motor vehicle.

8. The method of claim 1 wherein the method is repeated continuously in real time so that a perspective of the virtual perspective image displayed on the display device is consistent as the position of the camera changes.

9. The method of claim 1 further comprising displaying a graphic overlay on the virtual perspective image.

10. A system for displaying an image on a display device of a motor vehicle, the system comprising:

a rear-view camera connected to a moveable component on the motor vehicle; and
a controller in communication with the rear-view camera and having memory for storing control logic and a processor configured to execute the control logic, the control logic including capturing a field of view image from the rear-view camera, determining a position of the rear-view camera, wherein determining the position of the camera includes calculating the position of the camera from first and second reference points in the field of view image, wherein the first and second reference points include left and right license plate lights, determining an image perspective relationship of the field of view image based on the position of the rear-view camera, wherein the image perspective relationship relates a position of the rear-view camera, relative to the motor vehicle, to a desired perspective relative to the field of view image, modifying the field of view image based on the image perspective relationship to create a virtual perspective image, wherein the modifying the field of view image includes cropping the field of view image to the desired perspective, and correcting any distortions or warping in the cropped field of view image to create the virtual perspective image, and displaying the virtual perspective image on the display device in the motor vehicle as the position of the rear-view camera changes between at least a first position and a second position.

11. The system of claim 10 wherein the field of view image is approximately a 180 degrees field of view.

12. The system of claim 10 wherein the rear-view camera includes a gyroscope, and the control logic for determining the position of the rear-view camera includes sensing a change in the gyroscope connected to the rear-view camera.

13. The system of claim 10 wherein the control logic for determining the position of the rear-view camera includes determining the position of the rear-view camera from the first and second reference points in the field of view image using a look-up table.

14. The system of claim 10 wherein the control logic for determining the position of the rear-view camera includes sensing a position of the component that supports the rear-view camera on the motor vehicle.

15. The system of claim 10 wherein the control logic is repeated continuously so that a perspective of the virtual perspective image displayed on the display device is consistent as the position of the rear-view camera moves between the first position and the second position.

16. The system of claim 10 wherein the moveable component is a tailgate of the motor vehicle.

17. A system comprising:
a processor; and
a non-transitory computer readable medium for storing instructions for execution by the processor, the instructions comprising:
  capturing a field of view image from a rear-view camera mounted on a moveable component of a motor vehicle;
  determining a position of the rear-view camera relative to the motor vehicle, wherein determining the position of the rear-view camera includes calculating the position of the camera from first and second reference points in the field of view image, wherein the first and second reference points include left and right license plate lights;
  determining an image perspective relationship of the field of view image based on the position of the rear-view camera, wherein the image perspective relationship relates the position of the rear-view camera to a desired perspective;
  cropping the field of view image to the desired perspective based on the image perspective relationship;
  correcting any distortions or warping within the cropped field of view image to create a virtual perspective image;
  displaying the virtual perspective image on a display device in the motor vehicle; and
  repeating the instructions continuously as the position of the camera changes.

* * * * *